June 10, 1924.
C. M. WATROUS
WHEEL FOR TOYS
Filed June 8, 1922
1,497,659
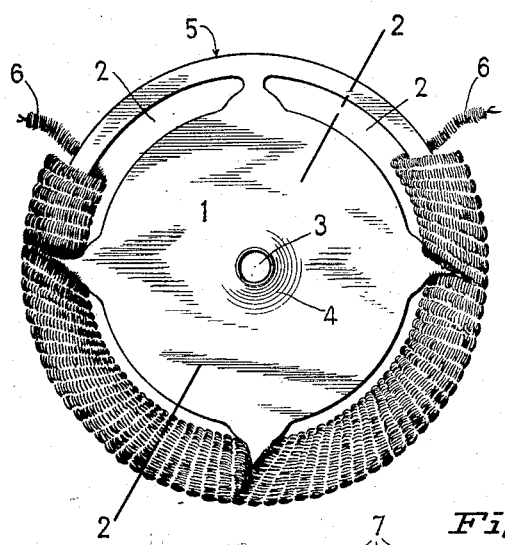
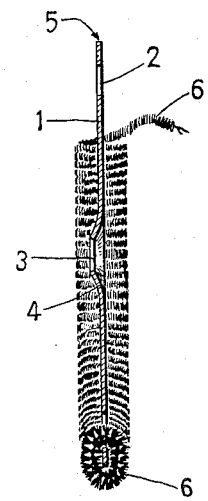
INVENTOR
*Clifford M. Watrous,*
BY
ATTORNEY Patented June 10, 1924.

1,497,659

UNITED STATES PATENT OFFICE.

CLIFFORD M. WATROUS, OF EAST HAMPTON, CONNECTICUT, ASSIGNOR TO GONG BELL MANUFACTURING COMPANY, OF EAST HAMPTON, CONNECTICUT, A CORPORATION OF CONNECTICUT.

WHEEL FOR TOYS.

Application filed June 8, 1922. Serial No. 566,901.

*To all whom it may concern:*

Be it known that I, CLIFFORD M. WATROUS, a citizen of the United States, and a resident of East Hampton, in the county of Middlesex and State of Connecticut, have invented certain new and useful Improvements in Wheels for Toys, of which the following is a full, clear, and exact description, whereby anyone skilled in the art may make and use the same.

The invention relates to toys and particularly to wheels which may be produced in quantity on a very economical basis and yet simulate, in appearance, the wheels such as are employed on motor vehicles, bicycles and other machines which almost universally use resilient tires.

The main object of the invention is to produce a very inexpensive type of wheel for toys of any description wherein the effect of the resilient tire is carried out.

A further object is to produce an extremely strong type of wheel having the desired characteristics.

One of the most expensive items in the manufacture of wheeled toys is to produce a wheel which will run evenly and smoothly. The present invention contemplates the production of just such a type of wheel which may be made up on dies from stampings and will, therefore, be uniform in character.

Where wheels are cast, it is necessary to trim the peripheral surfaces to secure a smooth run tread. Furthermore, it requires machining for the hubs in order to secure proper centralizing.

As hereinafter defined, the wheel herein contemplated is centered and has a smooth peripheral surface, all accomplished by blanking out and drawing up a sheet of metal in such manner as to give mechanism strength and desired appearance.

Referring to the drawings:

Figure 1, is a figure in side elevation of a wheel with a portion of the resilient tire removed.

Figure 2, is a sectional view through the wheel.

Figure 3, illustrates a form of material for providing a resilient tire.

In producing the wheels hereinafter described, sheet metal is first blanked out into a disc 1, having at or near its peripheral edge a series of slots or orifices 2, with a central perforation 3. In forming the central perforation 3, the hub 4, is forced out thus providing a plate disc wheel having a hub 4, with its axle opening, a perforation 3, and a smooth peripheral edge or tread 5.

In order to secure the effect of the pneumatic or other resilient tire, a band of resilient material 6, is wound about the outer edge of the disc and passed thru the elongated orifices or perforations 2, so that the entire outer edge and surface of the disc is completely covered by a resilient material and provides what to all purposes and intents is a "tired wheel."

Of course, any desired material may be looped about the outer peripheral edge and through the elongated orifices 2. A convenient form of material is illustrated in Figure 3, which is very inexpensive and of a chenille form. This is a well known material and consists of short tufts 7, held in juxtaposition by twisted thread 8, so it in effect, is a round soft cord.

Such a chenille cord, when wound about the rim of the wheel, gives an extremely attractive appearance thereto and forms a comparatively large tire of a resilient type. Furthermore, it protects the child playing with such a wheel toy from any possible rough or sharp edges in the stamped up wheel structure. Another advantage results from the ability to use any desired color in the chenille. This is particularly effective where highly colored toys are equipped.

It will be obvious that the wheel herein described may be produced in quantity and at a very nominal cost, inasmuch as sheet metal may be used, punched out and drawn up on dies at a very nominal expense. There is no finishing required. All of the die cut surfaces may be completely enveloped in the resilient tire material, with of course, the exception of the hub which is covered by the fixture by which it is secured to the axle.

Wheels made in accordance with the above description run true, may be readily assembled and have all the necessary attributes of appearance and finish so desirable in modern toy manufacture.

What I claim as my invention and desire to secure by Letters Patent is:

1. A wheel for toys stamped and drawn from sheet metal and having a centrally perforated hub, peripheral apertures, and a winding of indefinite length passed about the peripheral edge and through the apertures.

2. A wheel for toys, stamped out and drawn from sheet metal having an extended hub, disconnected orifices adjacent to the periphery of the wheel and a resilient material interlaced through said orifices and about the peripheral edge of the wheel.

3. A wheel for toys stamped from sheet metal having a central axle opening, disconnected orifices adjacent to the periphery of the wheel and a resilient material interlaced through said orifices and about the peripheral edge of the wheel.

4. A wheel for toys stamped from sheet metal and having disconnected orifices adjacent to the periphery of the wheel and the resilient material interlaced through said orifices and about the peripheral edge of the wheel.

CLIFFORD M. WATROUS.

Witnesses:
MAYO S. SEUPE,
MARY E. LYNCH.